United States Patent [19]

Mascaro

[11] Patent Number: 4,506,739

[45] Date of Patent: Mar. 26, 1985

[54] METHOD AND APPARATUS FOR RECONDITIONING AND AERIFYING TURF

[76] Inventor: Thomas C. Mascaro, Turfgrass Products Corp., P.O. Box 610366, North Miami, Fla. 33161

[21] Appl. No.: 564,571

[22] Filed: Dec. 22, 1983

[51] Int. Cl.$^3$ .............................................. A01B 45/02
[52] U.S. Cl. ..................................... 172/21; 172/165; 172/699
[58] Field of Search ....................... 172/21, 20, 19, 22, 172/165, 766, 768, 699

[56] References Cited

U.S. PATENT DOCUMENTS

| | | | |
|---|---|---|---|
| 629,559 | 7/1899 | Griffiths | 172/165 |
| 2,269,724 | 1/1942 | Linkogel | 172/21 |
| 2,590,399 | 3/1952 | Gilbert | 172/699 |
| 3,993,143 | 11/1976 | Moreland | 172/22 |

OTHER PUBLICATIONS

Corsicana Pasture Renovator–Published for Corsicana Groderand Machine Co., Corsicana, TX 1-1979.

Primary Examiner—Richard J. Johnson
Attorney, Agent, or Firm—Howson and Howson

[57] ABSTRACT

An implement and procedure for reconditioning and aerating turf is disclosed. The implement comprises a frame, a narrow plow member having a concave leading edge with a forward tip depending from the frame, and a pair of narrow blades declining at an angle from the frame and loosely engaging opposite sides of the plow member adjacent its tip. The blades are mounted in a particular manner and are provided with specially-shaped edges designed to provide the desired groove cutting action as the implement is pulled forwardly through the turf. The implement functions to cut and lift slivers of soil and sod and to deposit the same along a groove cut in the turf. Preferably, a series of parallel grooves are formed in the turf in a single pass, the widths and depths being determined by the nature and severity of the reconditioning or aerating problem being treated.

15 Claims, 8 Drawing Figures

METHOD AND APPARATUS FOR RECONDITIONING AND AERIFYING TURF

FIELD OF THE INVENTION

The present invention relates to soil working implements, and more particularly, the present invention relates to implements for use in reconditioning and aerifying intensively-used turf such as found on golf courses, athletic fields, and the like.

BACKGROUND OF THE INVENTION

When turf is subjected to intensive use, such as encountered on golf greens and athletic playing fields, certain problems tend to develop over a period of time. These problems include soil compaction, thatch accumulation, and poor drainage. Also, layers of dissimilar materials can cause poor conditions to exist within the soil, leading to shallow root growth. Lack of aeration is also known to be a factor limiting root growth.

Various techniques have been developed for controlling these problems; however, each has its limitations. For example, dethatchers utilizing rotary blades tend to be relatively slow and to require substantial power, not to mention their cost, complexity and associated maintenance problems. These, and machines that remove soil plugs or cores have a limited depth of penetration which, in turn, limits their utility in addressing the soil compaction and drainage problems.

OBJECTS OF THE INVENTION

With the foregoing in mind, a primary object of the present invention is to provide a novel implement for use in removing thatch, reducing soil compaction and improving soil drainage and aeration.

Another object of the present invention is to provide an improved device for use in maintaining turf in a healthy condition by slicing narrow grooves in the turf and removing slivers of soil and sod from the grooves in an efficient manner.

A further object of the present invention is to provide a unique soil and turf working implement capable of removing narrow slivers of soil and turf to substantial depths without materially disturbing the surface of the turf.

Yet another object of the present invention is to provide turf maintenance equipment which can be used to eliminate severe thatch, mat, layer, soil compaction and root bound soil problems in an efficient manner utilizing a unique plow and blade combination having no moving parts.

As a still further object, the present invention provides a novel turf treating procedure in which a series of relatively narrow deep grooves are formed in the turf and slivers of soil and turf removed without materially disturbing the turf adjacent the grooves.

SUMMARY OF THE INVENTION

More specifically, the present invention provides an improved soil working implement and procedure designed to overcome certain problems associated with intensive use of turf. The implement comprises a frame adapted to mount onto a traction vehicle, a plow member having a concave leading edge depending from the frame and terminating in a sharp tip, and a pair of blades which depend from the frame and straddle opposite sides of the plow member adjacent its tip. The blades are mounted with their trailing edges disposed slightly further apart than their leading edges and with their lower end portions loosely embracing opposite sides of the plow member. The upper portions of the blades are provided with symmetrical edges which slice the turf and maintain the blade spacing as the blades advance through the turf and soil. The lower portions of the blades are provided with asymmetrical surfaces designed to force their lower portions against the opposite sides of the plow member as the implement advances. Preferably, the traction vehicle has a drawbar which slidably mounts a series of plow member-blade combinations in spaced relation to enable a series of parallel grooves to be cut in the turf in a single pass. In the procedure of the present invention, grooves are cut to a predetermined depth in the turf, and soil and turf is lifted out of the grooves and is deposited on the turf alongside the groove without materially disturbing the turf alongside the groove.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENT

Figure 1:
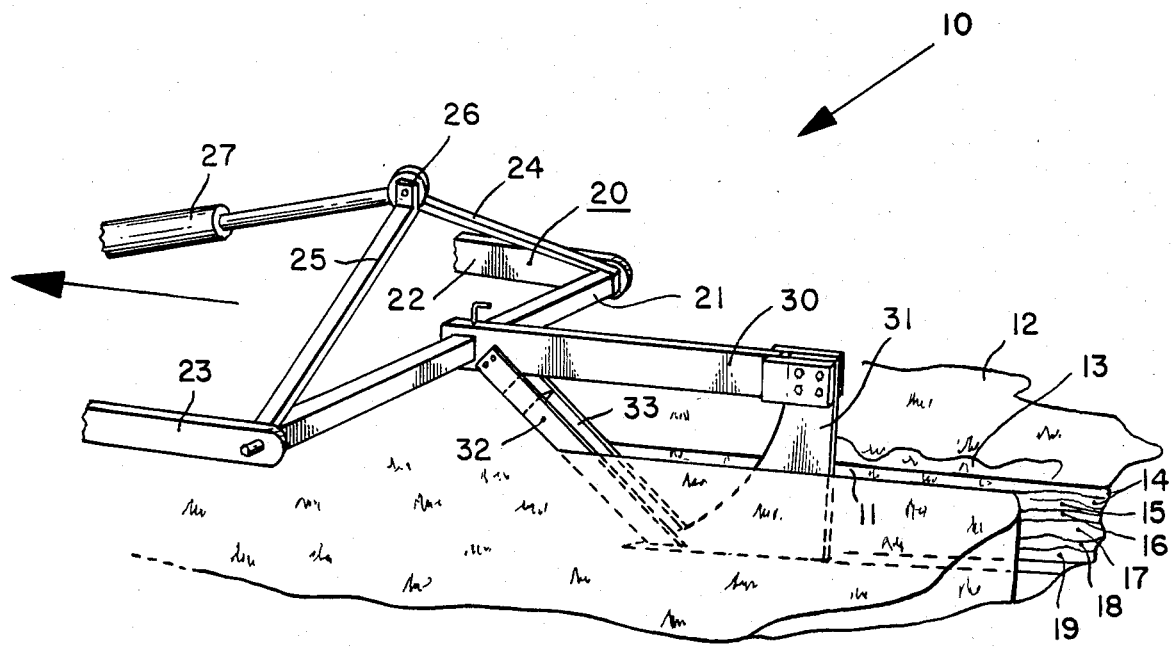
FIG. 1 is a fragmentary perspective view of a turf reconditioning implement embodying the present invention, the view illustrating the implement being drawn through an area of turfgrass.

Referring now to the drawings, FIG. 1 illustrates a turf reconditioning and aerating implement 10 embodying the present invention. As illustrated therein, the implement 10 functions to cut a groove 11 in an area of turfgrass 12 and to remove slivers of soil and sod 13 and deposit the same alongside the groove 11. Thus, the implement 10 cuts through layers of thatch, mat, compacted soil, root bound soil and soil having poor drainage properties such as clay, as indicated by the reference numerals 14–19, respectively in FIG. 1.

As discussed heretofore, one or more of the aforementioned layers may develop beneath turfgrass 12 either during construction, or due to poor turfgrass management, or when subjected to intensive use such as encountered on golf courses, athletic fields, and the like. The existence of such layers beneath the turfgrass 12 has a deleterious effect on the health of the turfgrass 12. Heretofore, there has not been available either apparatus or procedures for efficiently reconditioning and aerating turfgrass.

According to the present invention, the implement 10 comprises a frame 20 adapted to be connected to a traction vehicle, such as a tractor, or the like. The frame 20 has a horizontally disposed drawbar 21, a pair of hitch members 22 and 23, and a pair of inclined struts 24 and 25 which project upwardly and inwardly from the ends of the drawbar 21 for receiving a clevis 26 at the end of a hydraulic cylinder 27. The drawbar 21 is pivotally mounted in the hitch members 22 and 23 so that extension and retraction of the hydraulic cylinder 27 causes the drawbar 21 to pivot about its longitudinal axis.

The frame 20 also includes a boom 30 which extends rearwardly from the drawbar 21 and which is disposed substantially horizontally with respect to the surface of the turfgrass 12. A plow member 31 is mounted at the rear end of the boom 30, and a pair of blades 32 and 33 are mounted to the boom 30 adjacent its forward end. As illustrated in FIG. 1, the blades 32 and 33 cooperate with the plow member 31 and the boom 30 to cut the narrow groove 11 in the turfgrass 12 when advanced forwardly in the direction indicated by the arrow in FIG. 1.

Figure 2:
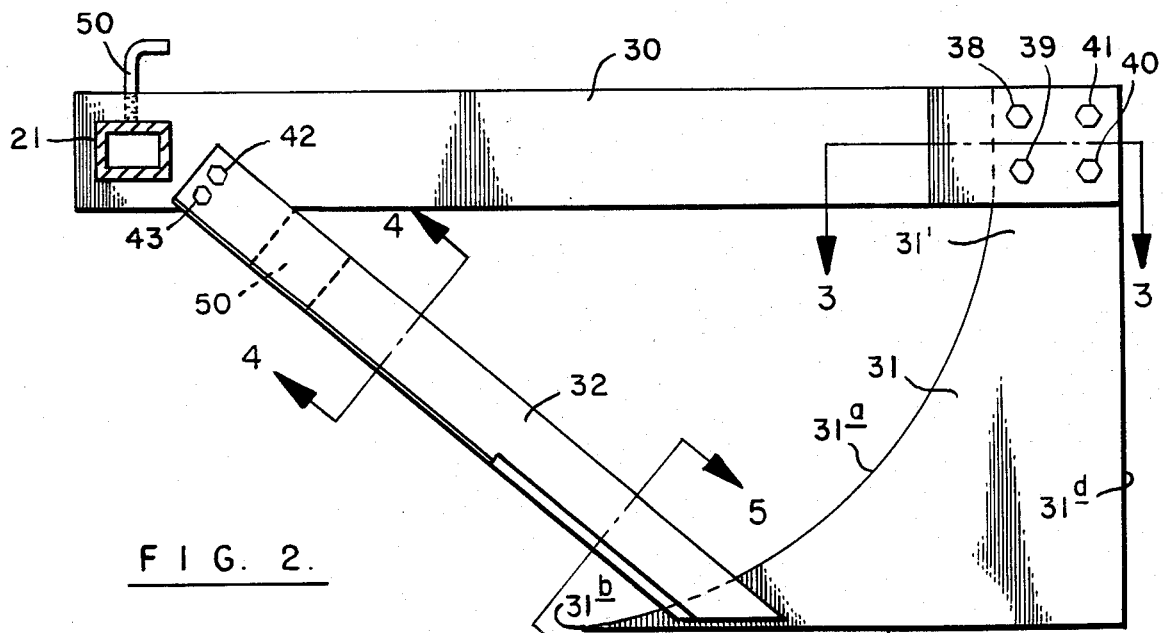
FIG. 2 is an elevational view of a portion of the implement illustrated in FIG. 1.
Figure 3:
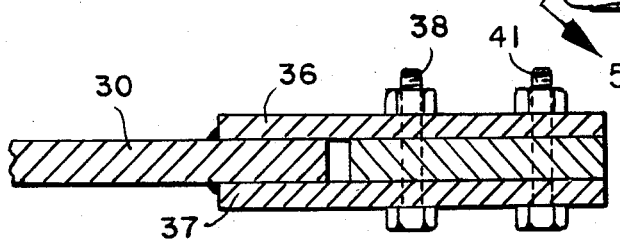
FIG. 3 is an enlarged sectional view taken on line 3—3 of FIG. 2.

Referring now to FIG. 2, the plow member 31 has a curved leading edge 31a which depends from a location adjacent the boom 30 and which terminates in a tip 31b below the boom 30. The leading edge 31a is flat across its width and inclines upwardly and rearwardly from the tip 31b, preferably in a curved, concave configuration. The plow member 31 also has a bottom edge 31c extending rearwardly from the tip 31b and forming a right angle with respect to the rear edge 31d of the plow member 31. Preferably, a wear plate or runner (not shown) is removably mounted to the lower edge 31c of the plow member 31 to afford ready removal and replacement in the event of wear. To fasten the plow member 32 to the boom 30, a pair of mounting plates 36 and 37 are welded to opposite sides of the boom 30, and the upper end 31' of the plow member 31 is sandwiched between the plates 36 and 37 and secured by bolts 38-41. See FIG. 3.

The blades 32 and 33 cooperate with the plow member 31 to slice through the turf 12 and deposit slivers 13 of the same alongside the groove 11. To this end, the blades 32 and 33 decline rearwardly from the forward end of the boom 30 in closely spaced parallel relation. The upper ends of the blades 32 and 33 are fastened to the boom 30 by bolts 42 and 43 and are thereby mounted in cantilever fashion thereto. The lower end portions of the blades 32 and 33 straddle opposite sides of the plow member 31 and loosely engage but are not connected to the plow member 31 adjacent its tip 31b. Preferably, the blades 32 and 33 are disposed at an angle of 30 degrees with respect to the surface of the turf 12 to slice through the same and form the groove 11 in the manner illustrated in FIG. 1 when the boom 30 is disposed parallel to the turf surface 12 when used on Northern grasses which are relatively tender and shallow rooted. When the implement is used to recondition and aerify tougher grasses, such as of the St. Augustine variety, it is preferable for the blades 32 and 33 to be disposed at a much smaller angle, such as 10 degrees. Hence, it should be apparent that for grasses having characteristics intermediate the specifically noted grasses, the angle of the blades can be adjusted within the aforementioned 10 degrees-30 degrees range.

The blade 32 has a leading edge 45 and a trailing edge 46. Its companion blade 33 has a similar leading edge 47 and a trailing edge 48. The blades are arranged with their trailing edges 46 and 48 spaced further apart than their leading edges 45 and 47 to accommodate the expansion of the soil which occurs after it has been sliced by the blades.

Figure 4:
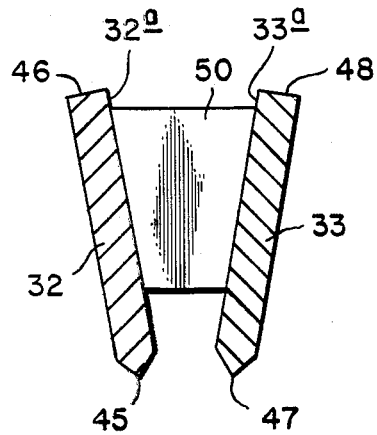
FIG. 4 is an enlarged sectional view taken on line 4—4 of FIG. 2 to illustrate a spacer separating the blades at slight dihedral angle.
Figure 5:
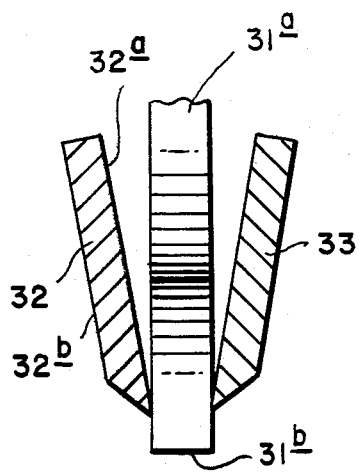
FIG. 5 is a sectional view taken on line 5—5 of FIG. 2.

The blades 32 and 33 are maintained in closely spaced substantially parallel divergent relation as they advance through the turf and soil. To this end, a spacer or separator block 50 is interposed between the blades 32 and 33 adjacent their point of attachment to the boom 30. As best seen in FIG. 4, the separator 50 extends between the insides 32a and 33a of the blades 32 and 33, respectively. The spacer 50 disposes the blades 32 and 33 at a slight dihedral angle with their trailing edges spaced further apart than their leading edges. Preferably, the dihedral angle is about 5 degrees.

Figure 6:
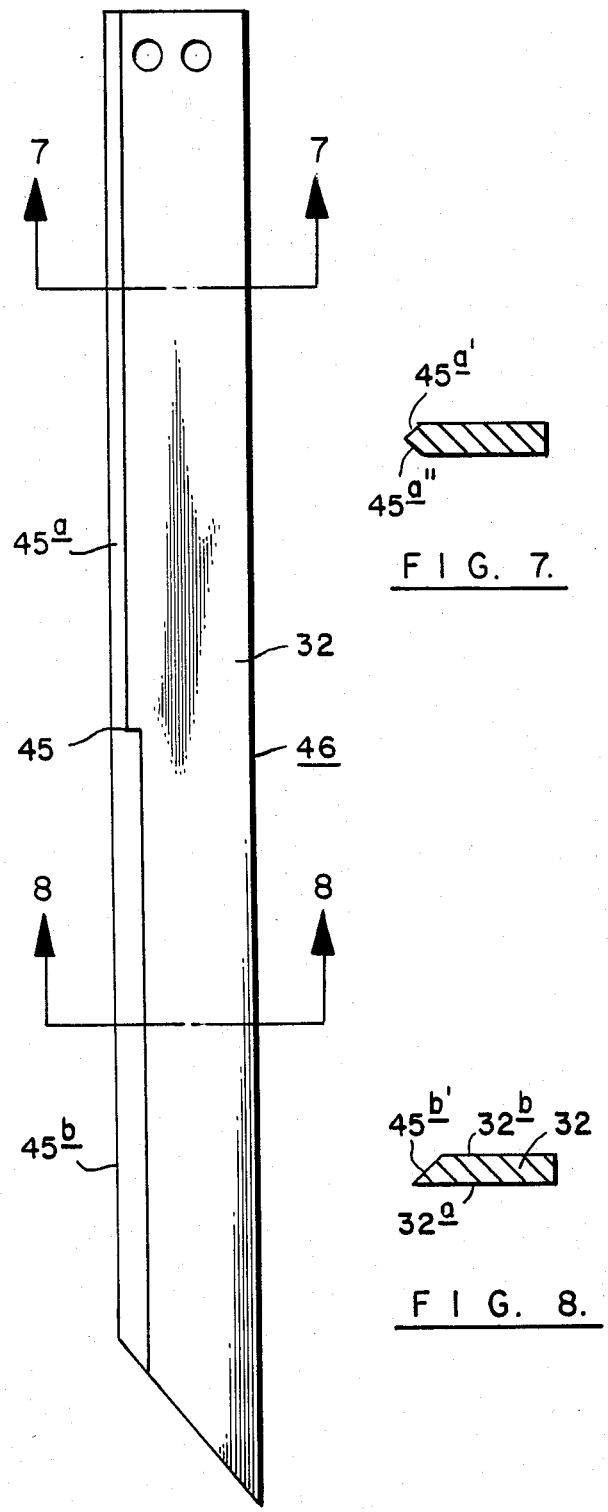
FIG. 6 is a plan view of one of the cutting blades utilized in the implement of the present invention.
Figure 7:
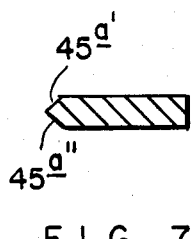
FIG. 7 is a sectional view taken on line 7—7 of FIG. 6.
Figure 8:
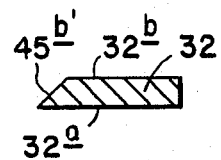
FIG. 8 is a sectional view taken on line 8—8 of FIG. 6.

As best seen in FIG. 6, the leading edge of each blade, such as the leading edge 45 of the blade 32, is divided into upper and lower portions 45a and 45b, respectively. As best seen in FIG. 7, the upper leading edge portion 45a is formed by a pair of bevelled surfaces 45a' and 45a'' which intersect at the center of the blade to provide a symmetrical cutting surface. The lower leading edge portion 45b is defined by a single bevelled surface 45b' (FIG. 8) which extends completely across the width of the blade 32 between its inside 32a and its outside 32b to form an asymmetrical cutting surface. As best seen in FIG. 6, the asymmetrical lower leading edge portion 45b extends about half the length of the blade 32, and the symmetrical upper leading edge portion 45a similarly extends for about half the length of the blade 32.

Preferably, a series of plow member-blade assemblies are mounted in spaced parallel relation to the drawbar 21 to form a series of grooves 11 in the turf 12 in a single pass. To enable the spacing between the grooves to be varied, each plow member boom is slidably mounted on the drawbar 21 and is provided with a locking handle 50 which, when rotated, engages the drawbar 21 to prevent lateral motion of the boom 30 thereon. The non-circular fit between the drawbar 21 and the aperture in the front of the boom 30 ensures pivotal motion of the boom 30 and hence lifting of the plow member 31 and blades 32 and 33 in response to extension and retraction of the hydraulic cylinder 27. Normally, the hydraulic cylinder 20 is fully retracted to maintain the tip of the plow member 31 spaced from the surface of the turf 12 until such time as the implement 10 is intended to be used.

The spacing between the grooves, as well as the depths of the grooves, may be varied, depending upon the desired degree of reconditioning and/or aeration required by the turf. For example, the spacing can be varied readily simply by sliding the booms relative to the drawbar 21 and locking them in place utilizing the locking member 50. The depths of the grooves are varied by adjusting the height of the hitch members 22 and 23 with respect to the surface of the turf 12 in a well known manner. For instance, when a tractor having a three point hitch arrangement is used as the traction vehicle, the hitch members 22 and 23 can be pivoted about their forward ends (not shown) and the hydraulic cylinder 27 adjusted to vary the height of the drawbar 21 with respect to the surface of the turf 12. Thereafter, retraction of the hydraulic cylinder 27 causes the boom 30 to pivot counterclockwise for raising the tip of the plow member above the turf surface 12 when not in use.

In operation, after the height of the drawbar 21 has been adjusted in the manner described heretofore, the hydraulic cylinder 27 is extended to cause the tip 31b of the plow member 31 to rest on the surface of the turf 12. Thereafter, as the vehicle begins to advance in the direction indicated by the arrow in FIG. 1, the cylinder 27 is further extended to cause the tip 31b to penetrate the turf 12. As the implement 10 is pulled forwardly, the curved leading edge 31a of the plow member helps to draw the plow member 31 downwardly into the soil until it reaches the desired depth where the bottom edge 31c of the plow member 31 is disposed substantially parallel with the boom 30 to run substantially parallel with the surface of the turf 12.

As the implement 10 advances, the leading edges of the blades 32 and 33 slice through the turf 12 and soil therebelow. The symmetrical arrangement of bevelled surfaces on the upper portions of the leading edges of the blades cooperate to maintain the upper portions of the blades in spaced parallel relation as they slice through the turf and soil. The outwardly and rearwardly inclined surfaces on the lower portions of the leading edges of the blades cooperate as the blades are drawn through the soil to force the lower portions of the blades inwardly against opposite sides of the plow member 31 adjacent its tip 31b.

The spacer 50 cooperates with the blades 32 and 33 to maintain the slight dihedral angle therebetween. The dihedral angle is important in providing a zone for expansion of the turf and soil after the same has been cut by the leading edges of the blades 32 and 33. The flat leading edge 31a of the plow member 31 cooperates with the blades 32 and 33 to lift the thin slice of sod and soil upwardly and rearwardly and to deposit the same along the side of the groove 11 as the implement 10 advances. Thus, the blades and plow member cooperate to cut a narrow groove in the turf 12 and to remove a sliver of turf and soil to a predetermined depth without materially disturbing the turf 12 along opposite sides of the groove 11.

By way of example, and not by way of limitation, an implement such as illustrated in FIG. 1 having a plow member 30 with a width of ½ inch, a radius of curvature of 18 inches, and a depth from boom bottom to bottom edge 31c of 18 inches is capable of forming a groove to a depth of 12 inches at a speed of about 3 to 6 miles per hour through compacted, somewhat damp sandy soil and St. Augustine grass. The speed with which the implement can be drawn through the soil depends on a number of factors, including depth of penetration, width of the groove, soil conditions, and the like. Accordingly, the speed with which a groove can be cut and a sliver removed will depend upon the horsepower and traction available to pull the implement 10.

The present invention also provides a method for reconditioning and aerifying turf. In the method, the width, depth and spacing between parallel grooves is varied depending upon the degree of reconditioning and aeration required. For instance, if the turf is a golf green, a preferred reconditioning and aerating procedure involves forming grooves having a width in a range of about ¼ to about ½ inch, a depth of about 6 to about 8 inches, spaced apart on 2 to 3 inch centers. In like manner, when the turf constitutes an athletic field playing surface, the grooves have widths of preferably about 178 inch, depths in a range of about 6 to about 8 inches, and are formed on centers ranging from about 4 to about 6 inches.

In view of the foregoing, it should be apparent that the present invention now provides an improved turf reconditioning and aerating implement and procedure which functions in an efficient manner to recondition and aerate turf. For instance, grooves formed by the implement can be filled with sand or other materials to assist in improving water percolation through the turf. Engineering filter fabrics could be placed in the vertical grooves to keep them open for longer periods of time to facilitate draining. For example, this can be effected by placing the filter fabric over the groove and pressing the same downwardly into the groove by means of a rotatable disk. Also, to improve the effectiveness of the implement in reconditioning and aerating turf on highly compacted soils, it may be desirable to mount a vibrator to the implement to facilitate slicing of the sod and soil. The implement has a number of uses, including pruning tree roots, forming trenches, forming irrigation-type ditching, planting, and injecting insecticides and fungicides.

While the implement 10 is illustrated installed on a tractor having a three point hitch system, it should not be regarded as so limited. The implement 10 may be incorporated in a small, self-propelled machine designed specifically for groove formation. If desired, the depth of penetration of the plow member can be varied by mounting rollers or wheels alongside the plow member to contact the turf surface when the plow has reached its desired operating depth and thereby preventing further penetration.

While a preferred embodiment and procedure have been described in detail, various modifications, alterations and changes may be made without departing from the spirit and scope of the present invention as defined in the appended claims.

I claim:

1. Apparatus for use in reconditioning and aerating turf by cutting grooves in the turf and depositing slivers of the turf alongside the groove, comprising:

frame means adapted to be coupled to a traction vehicle movable forwardly on the turf, at least on plow member depending from said frame means, said plow member having a tip adapted to penetrate said soil and an edge extending upwardly and rearwardy from said tip, a pair of blades depending from said frame means ahead of said plow member with a space therebetween, said blades having leading edges with upper and lower portions for slicing through said soil and sod as said vehicle advances, each of said blades also having insides and outsides and lower end portions loosely engaging opposite sides of said plow member adjacent its tip, the upper portion of the leading edge of each blade being defined by an intersecting pair of beveled surfaces and the lower portion of the leading edge of each blade being defined by a beveled surface extending rearwardly and outwardly from the inside of the blade to its outside, and means maintaining said blades disposed at a small dihedral angle relative to one another and with their trailing edges spaced further apart than their leading edges, whereby the blades cooperate with the plow member to cut a groove in the turf and to remove slivers of soil and sod as the frame is advanced along the turf.

2. Apparatus according to claim 1 wherein said blades decline rearwardly at an angle from said frame means to said plow member tip and define an acute angle with respect to the turf surface when said plow member is in use.

3. Apparatus according to claim 1 wherein the upper and lower portions of the leading edge of each blade extend about half the length of the blade.

4. Apparatus according to claim 1 wherein said blades are mounted in cantilever fashion to said frame means with their lower end portions unconnected to said plow member.

5. Apparatus according to claim 1 wherein said frame means includes a drawbar disposed transversely with respect to the path of movement of the vehicle, a boom extending rearwardly from said drawbar and mounting said plow member, and means for pivoting said boom for raising and lowering said plow member.

6. Apparatus according to claim 1 wherein said frame means includes a drawbar, a fitting on said boom slidable on said drawbar for adjusting the location of the boom thereon, and means for locking said fitting to said drawbar.

7. Apparatus according to claim 1 wherein said plow member has a bottom edge extending rearwardly from said tip and adapted to run horizontally beneath said turf as said plow advances therethrough.

8. Apparatus according to claim 1 wherein said plow member has a leading edge which is concave and flat across its width.

9. Apparatus according to claim 1 including spacer means disposed between said blades for maintaining said blades disposed at said dihedral angle with said angle being about 5 degrees.

10. Apparatus according to claim 1 wherein said blades decline from said frame means at an angle in a range of between about 10 degrees and 30 degrees with respect to horizontal.

11. Apparatus for reconditioning and aerating turf by forming a groove in the same and removing slivers of soil and sod from the groove, comprising:
a frame member adapted to be advanced forwardly above the turf,
a narrow planar plow member depending from said frame member and having a concave leading edge terminating in a tip a spaced distance below said frame member for penetrating and running through the soil beneath the turf,
a pair of narrow blades having leading and trailing edges depending downwardly and rearwardly from said frame member to said plow tip,
means mounting said blades to said frame member in cantilever fashion with their trailing edges spaced further apart than their leading edges,
said blades being disposed in closely spaced relation and having lower end portions loosely embracing opposite sides of said plow member adjacent its tip,
laterally tapering asymmetric leading edge surface means extending upwardly from said tip for biasing said lower tip portions inwardly against said tip as said plow member advances through the soil,
symmetrical leading edge surface means on each of said blades extending downwardly from a location adjacent said frame member to stabilize lateral motion of the blades as the frame member advances,
said blades cooperating with the plow member to form a groove in the turf and to remove and deposit slivers of the same alongside a groove cut in the turf by the blades and plow member.

12. Apparatus for use in cutting a groove in an area of turf and removing a sliver of sod and soil therefrom, comprising:
frame means movable with respect to said turf,
a flat narrow plow member depending from said frame means, said plow member having a concave leading edge terminating in a tip adapted to penetrate the turf and run through the soil below said turf,
a pair of narrow blades mounted to said frame means ahead of said plow member, said blades depending downwardly and rearwardly from said frame means in closely spaced relation and having lower end portions loosely embracing opposite sides of said plow member adjacent its tip,
lower surface means defining leading edges on the lower portion of each blade for cutting said soil and biasing the lower portions of the blades laterally toward one another into engagement with said tip of said plow member,
upper surface means defining leading edges on the upper portion of each blade for cutting the sod and soil and maintaining the spacing between said blades as said blades advance through the soil, and
means for disposing the blades in a shallow V-shaped configuration with their trailing edges spaced further apart than their leading edges to provide an expansion zone for the soil as the blades pass therethrough.

13. A method of reducing thatch and improving soil conditions beneath turf, comprising the steps of:
advancing through the turf a pair of closely-spaced blades inclined at an acute angle with respect to the turf surface for cutting a narrow slice of turf and soil,
advancing through the turf behind the blades a narrow plow member having an inclined leading edge with a tip disposed between lower portions of the blades for uplifting said narrow slice of turf and soil and forming a groove, and
depositing said slice alongside said groove as the plow member and blades advance.

14. The method according to claim 13 wherein said turf is on a golf green and said groove has a width in a range of about ¼ to about ½ inch, a depth of about 6 to about 8 inches, and wherein a plurality of said grooves are formed in parallel relation on centers ranging from about 2 to about 3 inches.

15. The method according to claim 13 wherein said turf is on an athletic field and said groove has a width of about ½ inch, a depth in a range of about 6 to about 8 inches, and wherein a plurality of said grooves are formed in parallel relation on centers ranging from about 4 to about 6 inches.

* * * * *

UNITED STATES PATENT AND TRADEMARK OFFICE
CERTIFICATE OF CORRECTION

PATENT NO. :  4,506,739
DATED      :  March 26, 1985
INVENTOR(S) : Thomas C. Mascaro It is certified that error appears in the above-identified patent and that said Letters Patent are hereby corrected as shown below:

Column 5, line 66, "178" should be --1/2--

Column 6, line 42, "on" should be --one--

Signed and Sealed this

Ninth Day of July 1985

[SEAL]

Attest:

DONALD J. QUIGG

Attesting Officer     Acting Commissioner of Patents and Trademarks